June 19, 1956 A. H. SCHILLING ET AL 2,750,739
APPARATUS FOR GENERATING DRIVING GASES
Filed Dec. 24, 1951 2 Sheets-Sheet 1
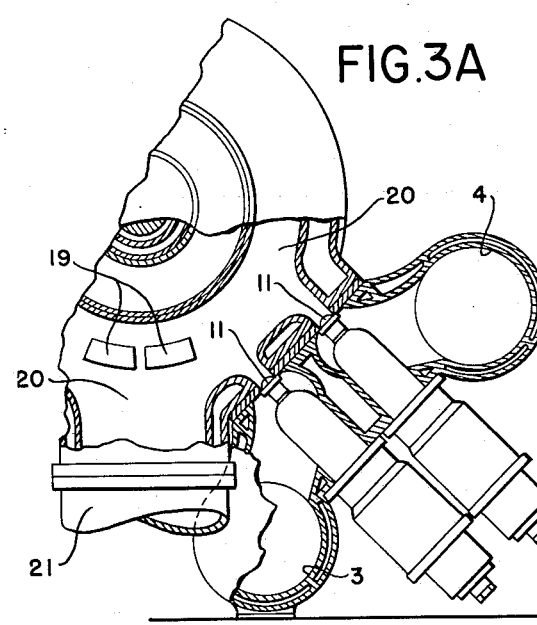
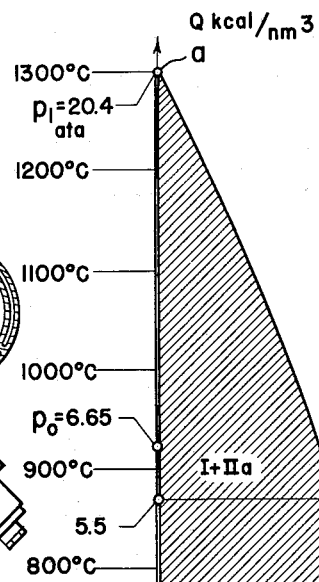
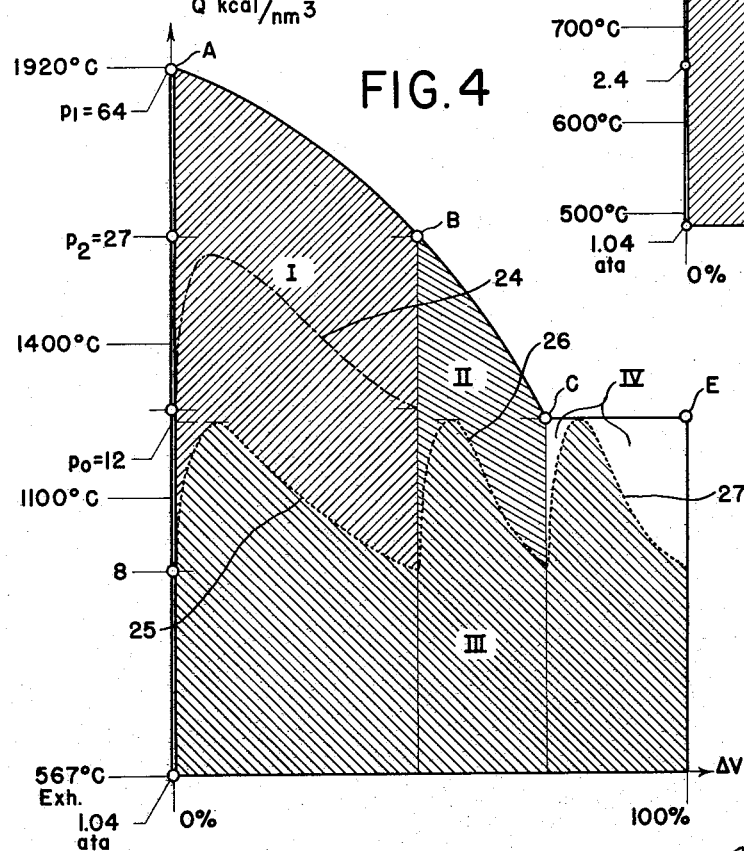
INVENTORS.
**August H. Schilling
Hans Holzwarth**
BY
ATTORNEY

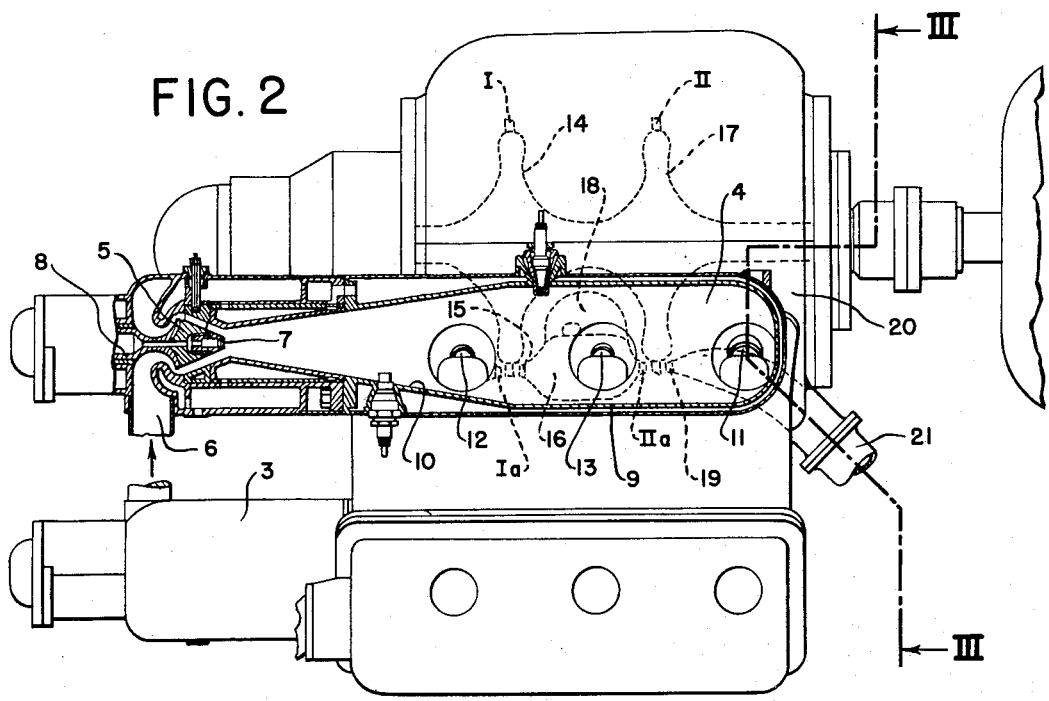
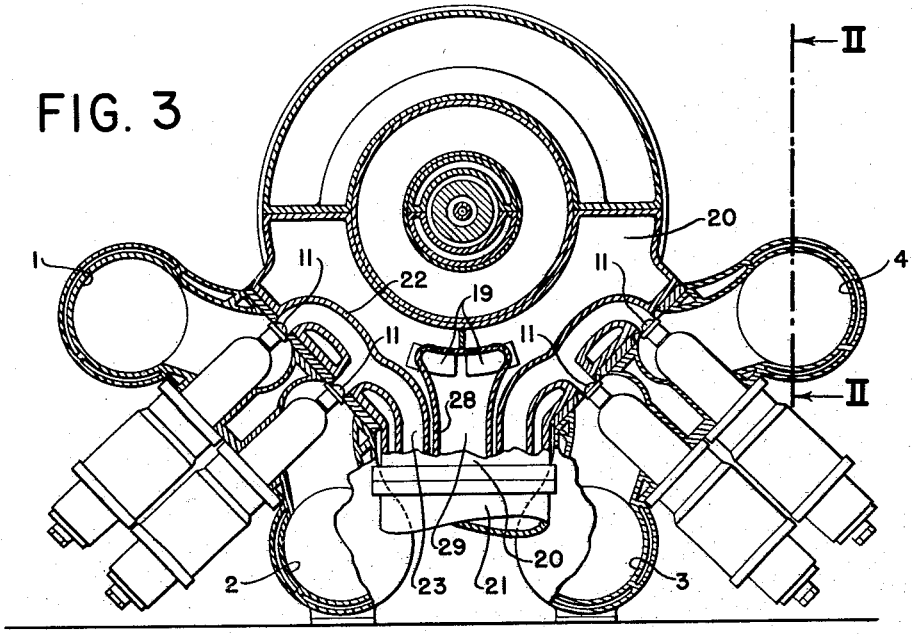
INVENTORS.
August H. Schilling
Hans Holzwarth

United States Patent Office 2,750,739
Patented June 19, 1956

2,750,739

APPARATUS FOR GENERATING DRIVING GASES

August H. Schilling, Atherton, and Hans Holzwarth, San Francisco, Calif., assignors to Schilling Estate Company, San Francisco, Calif., a corporation of California Application December 24, 1951, Serial No. 263,114

17 Claims. (Cl. 60—39.16)

The present invention relates to apparatus capable of operation as driving gas generators for producing combustion gases by explosion with working up of the combustion gas drops in one or more nozzle and blading assemblies, and to a process for operating the same.

In view of the increased explosion gas pressures and temperatures attained in the course of development of explosion turbine plants and the increase of the available enthalpy drops effected thereby which are converted in the bladings, the total drop has already been divided and several stages have been employed for working up the same. The total combustion gas volume generated in the individual explosion chambers during each explosion was initially not subdivided, but originally a plurality of turbine stages were provided which worked up the same combustion gases one behind the other in stages subdivided with respect to pressure.

In the course of further development, it was proposed to subdivide the combustion gases generated in each explosion with respect to quantity. Thereby there developed as the most promising form the process of first withdrawing the higher pressure combustion gases from the explosion chamber through a controlled discharge member; the conduit (nozzle pre-chamber) for combustion gases leading from this discharge member led into a nozzle arrangement disposed in advance of the blading of the first turbine stage, so that this discharge member was usually designated as a nozzle valve. Each explosion chamber had a second controlled discharge member through which combustion gases were expelled, such gases, upon closing of the nozzle valve, having in the explosion chamber practically the same pressure as the charging air. The charging air, which was admitted simultaneously with the opening of this second discharge member, usually designated as an outlet valve, displaced the residual combustion gases out of the chamber through the outlet valve and simultaneously filled the chamber. In order to utilize the working capacity of these residual combustion gases which still possessed considerable pressure, temperature and heat content, they were conducted to a separate nozzle assembly which was not only spatially separated from the first nozzle assembly but was disposed in advance of a second turbine stage which worked up also the gases discharging from the first turbine stage by means of a third nozzle assembly, after these partially de-energized combustion gases had been equalized as far as possible with respect to their pressure fluctuations in a pressure equalizer provided between the turbine stages.

Further investigation showed, however, that this mode of working up the combustion gases could not lead to the desired rotor efficiencies because large differences in the drops to be worked up always appeared. With pressure equalization between the stages, the energy drops of the high pressure explosion gases not only in the first but also in any second nozzle and rotor blading assembly are not constant, but fluctuate widely, and the same is true of the working up of the lower pressure, residual combustion gases; in addition the work done by the residual combustion gases turns out to be very small in comparison with that performed by the high pressure portion of the explosion gases.

It is the general object of the present invention to provide an improved combustion gas generator from both the thermodynamic and constructional standpoint and capable of operation in a highly efficient manner.

More specifically, it is an object of the invention to provide an improved apparatus for the generation of combustion gases capable of doing further work, and wherein a more desirable distribution of the energy drop among a plurality of turbine stages is effected while at the same time substantially constant drops in the individual stages are provided for.

Other objects will appear from the following description and the features of novelty will be set out in the appended claims.

According to the present invention, driving gas generators for the production of combustion gases by explosion are constructed and operated in such manner that by simultaneous or approximately simultaneous opening of the air charging and combustion gas outlet members, the residual combustion gases are displaced by the charging air and are conducted to spaces located behind the nozzle and blading assemblies of the driving gas generator, viewed in the direction of gas flow.

This conduction of the residual combustion gases to spaces lying behind the nozzle and blading systems of the driving gas generator affords first of all the possibility of utilizing the residual combustion gases thereby conducted to spaces of lower pressure, and hence themselves of lowered pressure, by connecting these spaces to nozzle and blading systems arranged anteriorly to them in the combustion gas path for the formation of a fluctuating or pulsating counterpressure of reduced degree with reference to these nozzle and blading systems. In particular, the counterpressure course can be generated in the plane of connection of the driving gas withdrawing conduit with the housing surrounding the nozzle and blading systems. This has the advantage that in the anteriorly arranged spaces, above all in the rotor space of the last rotating blading, a corresponding counterpressure course develops as these spaces are all in open communication with each other. There accordingly appears in the nozzle and blading systems themselves uniform or approximately uniform drops, because the combustion gases expanding therein likewise fall in pressure, so that expansion and counterpressure courses show a simliar characteristic. There must, however, be provided, in a manner to be described in detail hereinbelow, for the synchronism or approximate synchronism of these procedural measures in order to be able to realize the desired constancy of the gas drops.

If there is first considered the question to which spaces the residual combustion gases can be advantageously conducted, then in the choice between existing spaces and in the creation of new spaces expressly for the mentioned purpose there is above all the condition to be satisfied that the desired reaction upon the nozzle and blading systems takes place. This condition is satisfied when the residual combustion gases are conducted directly into the conduit which withdraws the gases from the driving gas generator, e. g. to the conduit which supplies the driving gases to an engine which utilizes them. This conduit must stand in open communication with the nozzle and blading systems. There is however to be taken into account the fact that the filling volume of this driving gas withdrawing conduit or of the turbine exhaust housing in advance thereof is relatively large, so that fluctuations in the course of the counterpressure line, speaking diagrammatically, which is to be maintained equidistant with respect to the expansion line, that is, irregularities in the equidistance, can occur. (For a detailed explanation of this equidistant relationship, see the co-pending application of August H. Schilling, entitled "Apparatus for the Generation of Driving Gases by Explosion and Process for Operating the Same," filed December 24, 1951, Serial No. 263,113.)

According to the present invention, the residual combustion gases are caused to flow to the driving gas withdrawal conduit by way of separate spaces of small volume which are directly connected to the outlet valves of the explosion chambers but are suitable separated from the turbine exhaust housing although preferably disposed therewithin. In this connection, taken into consideration the necessary length of the spaces, their cross-sectional form is to be understood as being such that it does not exceed, or not substantially, the valve cross-section of the valves in the open condition, having regard to the change in the specific volume of the combustion gases in the expansion which sets in behind the valves. If the described fluctuations are taken into account for reasons of simplified construction, then the residual combustion gases can naturally be introduced also into a portion of the exhaust housing of the turbine, since the possibility still exists there of a favorable reaction of the pressure course of the residual combustion gases on the nozzle and blading systems, even if to a reduced degree. What has been said with reference to the residual combustion gases applies correspondingly for the exhaust gases of the last turbine stage. These also can be collected in spaces of small volume connected to the catch nozzle aggregate behind the last blading, and without formation of a definite exhaust housing, can be conducted directly to the driving gas withdrawing conduit while being kept separated as much as possible from the residual combustion gases up to such conduit.

In order to secure the already mentioned synchronism, it is necessary to impinge the nozzle and blading systems of the turbine itself with higher pressure combustion gases during the interval of leading off of the residual combustion gases. In this connection it is of advantage to displace the working cycle sequence of several explosion chambers associated with the nozzle and blading systems, so that, during the interval of the expansion of higher pressure gases, withdrawn from one explosion chamber, in the nozzle and blading system, residual combustion gases are displaced out of another explosion chamber by charging air entering the same, and these lower pressure combustion gases and conducted to spaces behind the blading system. In this case the counter-pressure produced by the residual combustion gases with reference to the anteriorly arranged nozzle and blading system fluctuates synchronously and with similar characteristic to that of the expansion line associated with this nozzle and blading system, that is, both lines run approximately equidistant in a Q-V diagram corresponding to this process. This means that this anteriorly arranged nozzle and blading system is impinged with approximately uniform drop, so that by the measures proposed by the present invention there results first of all the effect of a high rotor efficiency. In addition to the advantage to be explained hereinbelow in connection with the diagram, namely, that the residual combustion gases themselves are better utilized thermodynamically than was possible according to prior processes, there is further obtained an extensive simplification of the turbine construction in that the nozzle aggregate heretofore provided for the residual combustion gases is completely eliminated, and thereby the upper part of the turbine housing need be constructed only in accordance with its function as a container cover.

Our improved apparatus makes it possible above all to use the so-called open charging, which consists in introducing the fuel during the displacement of the residual combustion gases from the charging air inlet valve to the combustion gas outlet valve while keeping both valves open simultaneously. Thereby the flow energy of the moving charging air piston, which because of the provision of certain flow-technical measures at the inlet ends of the explosion chambers can be formed and maintained in the chambers, is utilized for uniform spatial distribution of the fuel and hence for the formation of a homogeneous, uniform charge in the explosion chambers, without there existing any danger of disturbing this condition of movement under the action of the ventillation of the rotating bladings, because the residual combustion gases and hence the charging air pistons are brought into communication only with dead spaces in which no whirling can be produced by moving machine parts.

The devices for carrying out the above-described process can be variously constructed. They are characterized advantageously by the fact that the explosion chambers are provided with controlled outlets, particularly outlet valves for the residual combustion gases displaced by the charging air, which are connected with spaces behind the blading systems, viewed in the direction of flow of the combustion gases. If the explosion chambers have, in addition to the outlet members for the residual combustion gases, further (controlled) outlets for combustion gas portions of different pressures, which are conducted to nozzle and blading systems, then there arises the already described possibility of producing uniform drops in these nozzle and blading systems through the aid of the fluctuating counterpressure course to be produced by the residual combustion gases. A special catch nozzle arrangement is suitably provided in the housing of the blading system which works up combustion gases of lowest pressure, which catch nozzle arrangement is in open communication with conduits for the residual combustion gases discharged from the explosion chambers. These conduits can be constructed in the form of short conducting tubes of small cross-section and debouch into the driving gas withdrawal conduit. A constructionally compact arrangement results especially when a connecting body for the combustion gases discharging from the catch nozzles and attached to the catch nozzle assembly is arranged between the conducting tubes for the residual combustion gases to the driving gas withdrawal conduit. If this connecting body and the tubes debouch in the plane of attachment of the driving gas withdrawing conduit to the turbine housing, then on the detour by way of tubes for the residual combustion gases and the connecting body for the combustion gases discharging from the catch nozzles, there occurs indirectly the desired counterpressure formation in relation to the nozzle and blading systems of the turbine, while on the other hand the advantage arises of being able to make useful any pressure differences between the exhaust gases of the last turbine stage and the residual combustion gases. For this reason it is advantageous to make the construction such that, taking into account the still high temperatures of the combustion gases in the connected body and in the tubes, that is, both in the connecting spaces between the catch nozzles and the driving gas supply conduit as well as in the conduits between the latter and the controlled explosion chamber outlets, these parts are formed as bladder-shaped, thin-walled, hollow bodies. We have found that bladder-shaped vessels so constructed can be controlled best with respect to all heat transfer, cooling, temperature and strength relationships, so that no operational difficulties can appear. The same construction also affords the possibility of nesting the connecting body between the catch nozzles and driving gas supply conduit on the one hand, and the tubes between the driving gas supply conduit and the controlled explosion chamber outlets on the other hand, one within the other, and to construct them suitably as the head-piece and connecting member of the driving gas supply conduit to the driving gas generator or its parts.

On the accompanying drawing there are shown by way of example two satisfactory constructional embodiments of the invention, the same being in the form of an oil-driven driving gas generator constructed as a two-stage explosion turbine plant with four explosion chambers. In said drawing, Fig. 1 is a Q-V diagram of an explosion turbine operating according to known processes;

Fig. 2 is a side view partially in elevation of the driving gas generator, and is in part also a section through one of the explosion chambers taken along the line II—II of Fig. 3;

Fig. 3 is an end view of the turbine arrangement and also a partial cross section therethrough along the line III—III of Fig. 2;

Fig. 3A is a view similar to Fig. 3 but showing a modification; and

Fig. 4 shows the Q-V diagram of a driving gas generator in the form of an oil turbine according to Figs. 2 and 3.

To facilitate an understanding of the invention there is shown in Fig. 1 the Q-V diagram of a known turbine plant. Such Q-V diagram shows as ordinates the heat content of the outflowing combustion gas portions, the illustrated double line applying only for the condition a, that is, for the highest explosion pressure $p_1$, and indicates for such condition the adiabatic drop in k. cal./nm$^3$. This double line represents the changes of condition during the expansions. These changes appear in the Q-S or Q-V diagram as vertical adiabatic lines, but only in the ideal machine, in which no change of entropy appears during the expansion, that is, no heat is lost to the walls and no heat is absorbed from the friction heat of the rotors and blades. In the practical machine, however, both of these phenomena occur. Careful investigations on the heat interchange at the walls on the part of the combustion gases, and calculations of the ventilation or windage losses of the wheels and blades show that in carefully designed plants the methods of operation which from the practical standpoint come chiefly into consideration there is substantial equality between the heat delivered and the heat absorbed. It is, therefore, approximately correct to assume that the changes in combustion gas conditions during the expansions are adiabatic changes in condition also for the practical machine, and these appear in the Q-S or Q-V diagram as vertical lines.

The abscissae represent the discharged combustion gas volumes in percent of the total volume generated per explosion chamber which is designated as 100%. The Q-V diagram thus corresponds essentially to a Q-S (entropy) diagram according to Pflaum, wherein the discharged combustion gas volumes appear as abscissae. If the nozzle assembly of the first turbine stage impinged by the combustion gas portion of higher pressure is designated as I, and the nozzle assembly impinged after pressure equalization by the combustion gases which have been partially worked up in the first turbine stage as IIa, then there will be recognized in the areas I+IIa the work area which is assigned to the combustion gas portion which was originally of higher pressure, while the residual combustion gases worked up in a nozzle assembly IIb have the working area IIb.

The diagram, which is drawn to scale, makes it immediately clear that large differences in drop occur in the nozzle arrangement IIb; the diagram shows further that the working capacity (area IIb) of these residual combustion gases actually utilized in the second turbine stage turns out rather small in comparison to the working area (I+IIa) of the combustion gases of originally higher pressure, so that the constructional cost of a special nozzle arrangement IIb for these residual combustion gases does not stand in favorable relationship to the obtained usefulness. In addition, there is the circumstance that the nozzle assembly IIb can be disposed only in the upper half of the housing of the turbine because, in view of the usual sub-floor arrangement of the explosion chambers, the nozzles I and IIa lie in the lower half of the housing. Combustion gas conduits to the upper half of the housing, however, always create constructional difficulties and disturb the clear over-all design of the turbine.

Referring now to the constructional embodiment of the invention shown in Figs. 2, 3, and 4, the numerals 1, 2, 3, and 4 indicate the explosion chambers, chamber 4 being shown in Fig. 2 in longitudinal section, while chamber 3 is shown in elevation. Each explosion chamber is provided with a charging air inlet valve 5, that of chamber 4 being shown in the just opened position. Supply conduits 6 for the charging air conduct the compressed charging air to the explosion chambers. Built into each charging air valve 5 is a fuel injection valve 7 to which the fuel is conducted by the conduit 8. The latter is connected with a fuel pump (not shown) of known construction. Each explosion chamber is also provided with an ignition device of known type (not shown). The transition of the explosion chamber walls from the charging valves 5 to the cylindrical or prismatic portion 9 of the chambers is in the form of a venturi nozzle whose diffusor 10 has a very slight inclination or taper, so that the air entering through the valve 5 assumes the form of a piston which advances without mixing with the residual combustion gases in advance of the same (in the direction of movement) and displaces such gases out of the explosion chamber. The gases escape through the automatically controlled outlet valves 11 at the discharge end of the explosion chambers. In addition to the outlet member 11, each chamber is provided with nozzle valves 12 and 13. The nozzle valves 12 discharge from the explosion chambers the combustion gas portions of highest pressure to the nozzle assembly Ia arranged in advance of the turbine wheel 14 of the first turbine stage having the blading I. A catch nozzle 15 collects the combustion gases discharging from the nozzle and blading arrangement I, 14 of the first turbine stage and conducts it to a collecting chamber 16 which in turn passes over into a nozzle arrangement IIa disposed in advance of the blading II of rotor 17 of the second turbine stage. Conduits 18 debouch into the collecting chamber 16, such conduits being connected to the discharge ends of the nozzle valves 13, so that the nozzle assembly IIa works up all combustion gases which flow through the turbine cross-section in whose axial position the nozzle assembly IIa is located. A catch nozzle assembly 19, which can be seen also in Fig. 3, receives the combustion gases which have performed work in the turbine aggregate II, 17 and conducts them, according to the simplified construction of the right half of Fig. 3, to the exhaust housing 20 of the turbine system. The driving gas supply conduit 21 is connected to the exhaust housing 20.

While the two outlet valves 11 according to the right half of Fig. 3 discharge the residual combustion gas portions directly into the exhaust housing 20, the preferred form of the invention shown at the left half of Fig. 3 involves, with reference to the outlet valves 11, the difference that a conducting tube is connected to the discharge openings of the valves 11 for receiving the residual combustion gases, such tube being in the form of a flat bladder-like body 22 which in turn opens at 23 into the driving gas withdrawal conduit 21 at a point where the connecting flange of the conduit bears against the turbine housing 20. The bladder-like connecting body 28 debouches in the same plane, such body conducting the combustion gases flowing out of the catch nozzle assembly 19 into the conduit 21.

The turbine arrangement above described operates in the following manner:

Let it be assumed that in the explosion chamber 4 the explosion process has just been brought to an end so that in the same chamber the highest explosion pressure $p_1$ (point A in Fig. 4) has developed. At this instant the nozzle valve 12 is opened while all other valves are still closed and remain so. In consequence, a combustion gas portion of highest pressure is discharged, only a portion of the gases being discharged because the nozzle valve 12 closes at the instant B (Fig. 4). The discharged combustion gas portion, which is originally of the highest pressure, impinges the rotor 14 by way of the nozzles Ja of the first turbine stage with the single row of blading I. The partially de-energized gases are caught in the catch nozzle arrangement 15 and conducted to the collecting chamber 16. Another chamber, has however, during a time interval corresponding to the distance between the points A and B in the diagram of Fig. 4, already had its associated nozzle valve 13 opened and has discharged into the collecting chamber 16, by way of one of the conduits 18, a combustion gas portion of lower pressure whose original pressure condition is indicated by a point of the diagram corresponding to the point B of Fig. 4, which belongs to this second chamber. A third chamber had in turn during the same time interval had its outlet valve 11 opened and has discharged the residual gas portion into the spaces 22 or also space 20, which residual gas portion was expelled out of the chamber by the action of the simultaneously introduced charging air. If we consider again the events in the explosion chamber 4, then the nozzle valve 12 is closed while the nozzle valve 13 is opened in such chamber at the instant B, and there discharges out of such chamber a lower pressure combustion gas portion of the gradient condition B of Fig. 4. At the same time, another chamber has had its nozzle valve 12 opened, and again a combustion gas portion of highest pressure is discharged to the first turbine stage I, 14, and another chamber has had its outlet valve 11 opened so that its residual combustion gas portion discharges into the spaces 22 or 20 by way of such valve 11.

Returning now to a consideration of chamber 4, it will be understood that the chamber has during the interval corresponding to the distance between the points B and C filled the collecting chamber 16 and produced in such chamber an internal pressure which acts as a definitely pulsating counterpressure to the anteriorly arranged nozzle and blading system I, 14. The influencing of the counterpressure proceeds in such manner that in this first turbine stage practically constant changes in enthalpy occur—see the equidistance between the expansion line AB and the counterpressure line 24 in Fig. 4. At the point C, the outlet valve 13 of the chamber 4 closes and the outlet valve 11 opens; at the same time the air-charging valve 5 of such chamber opens. Compressed air enters through the conduit 6, spreads out in the diffusor 10 in the manner of a piston and displaces the combustion gases of condition C (Fig. 4) occupying the chamber 4, the gases being then of a pressure $p_0$, which coincides with the air charging pressure, during a period corresponding to the interval between the points C and E. Even before the point E is reached, the associated plunger of the fuel pump performs its pressure stroke, so that fuel is injected through the valve 7 into the charging air piston which is still in motion. As the outlet valve 11 is still open, there occurs a so-called open charging which has the advantage of a uniform distribution of the fuel over the whole, quite considerable chamber length, so that all pre-conditions for the formation of a homogeneous charge and hence of a powerful explosion with steep rise of the explosion pressure line in the diagram are fulfilled. At the point E the charging air valve 5 and the outlet valve 4 are closed. A short time thereafter the ignition occurs and the explosion follows until again the condition A of the explosion chamber with the development of the highest explosion pressure $p_1$ is reached.

From Fig. 4 there can clearly be seen to what thermodynamic results the above described process and the means provided for its realization lead. In addition to the already mentioned points A, B, C and E, there is shown also the working area I which corresponds to the available work of the combustion gas portion which was discharged by the valve 12 and which therefore performed work both in the first turbine stage I, 14 as well as in the second turbine stage II, 17. There is shown also the line 24 in the form of a dot-and-dash line which corresponds to the internal pressure in the collector chamber 16, so that it will be recognized that in the area lying above this line, uniform enthalpy drop conditions could be maintained with reference to the first turbine stage. But also in the area lying below line 24 which reaches to the upper boundary of the area III and which reproduces the drops which are associated with the same combustion gas portion in the turbine stage II, 17 and discharged by the valve 12 it is clear that the same combustion gas portion encounters approximately constant changes in enthalpy also in the turbine stage II, 17. This applies in similar fashion for the region II of the combustion gas portion discharged by the valves 13, as here also the upper bounding line of the area III again runs equidistant or approximately equidistant to the expansion line section BC. These favorable conditions are attained by the shaping of the upper boundary line of the area III, which corresponds to the available working capacity of the combustion gases flowing through the driving gas conduit 23. Causative for this upper boundary line for the area III is the circumstance that the residual combustion gas portions are no longer, as heretofore, conducted to a special nozzle assembly of a turbine stage, but are conducted in accordance with the invention to spaces 22 or 20 behind the nozzle and blading systems I, 14 and II, 17, viewed in the direction of flow of the gases.

The area III shows much more equalized and smaller fluctuations in the gradient or drop than Fig. 1, the possibility not having yet been considered of providing special additional spaces for pressure equalization connected to the spaces, 22, 28 and if necessary also 20 and 21. There will, however, be recognized above all the equidistant course of the counterpressure line 25 to the counterpressure line 24 which in reference to the counterpressure line 25 becomes an expansion line section because combustion gases of the condition represented by line 24 flow through the nozzle assembly II as combustion gases impinging the second turbine stage. The approximately equidistant course of the counterpressure line section 26 in relation to the expansion line section B-C in region II has already been mentioned, so that the result is also attained that the combustion gas portions discharging through the nozzle valves 13 are subjected to constant or nearly constant drops as they are worked up in the second turbine stage II, 17. For this reason, it is advisable to obtain first the forms of the counterpressure course represented by the sections 25, 26, 27, so far as they can be worked out on the anteriorly arranged nozzle and blading systems, and only later, in sections of the driving gas supply conduit 21 lying further removed, to undertake a pressure equalization which could not be taken into account in Fig. 4 because it is here a question of the reaction of the residual combustion gases upon the enthalpy changes in the anteriorly arranged turbine stages. For this reason the shape of the bladder-like conduit 22 can be given smaller dimensions than the exhaust housing 20; for the same reason, it is likewise advantageous to catch the combustion gases leaving the catch nozzles 9, into the second, thin-walled and bladder-like connecting body 28, but by combining the outlets 23 and 29 at the inlet end of the driving gas supply conduit 21 to take care that the favorable effects on the blading II, 17, and thus also on the collecting chamber 16 and hence finally upon the first turbine stage I, 14 and indicated by the lines 25, 26 and 27, appear.

What has been said above for a two-stage turbine applies naturally also for any other practical number of stages, that is, for single stage turbines, three stage turbines, etc.

In view of the fact that not only the pressure but also the temperature and the physical constants (gas constant, adiabatic exponent, etc.) of the combustion gases influences the combustion gas condition which in reference to another condition leads to a definite enthalpy drop, it would be theoretically possible to effect a change of the drop bounding lines 24, 25, 26 and 27 in Fig. 4 without altering the pressure of the combustion gases and thus the counterpressure upon the anteriorly arranged nozzle and blading systems. As thereby the essence of the invention is not departed from, the expression "counterpressure" is to be understood also in this further sense of the lines in the Q-V diagram corresponding to these counterpressures.

It will be understood that suitable valve timing and operating mechanism will be provided for opening and closing the various valves at the proper instants. Such timing and operating mechanism can be electrical, mechanical or hydraulic, or combinations of these modes of valve timing and operating. Hydraulic mechanisms of this type have proved particularly suitable for the control of the valves of explosion turbines, various forms of such devices being shown in United States Patent Nos. 1,756,139, 1,763,154, 1,786,946, 1,933,385, 2,010,019, 2,063,928. As the valve timing and operating mechanism forms no part of the present invention, it has not been deemed necessary to illustrate the same.

We claim:

1. Apparatus for generating driving combustion gases, comprising a plurality of explosion chambers, nozzle and blading systems arranged to receive high pressure explosion gases from said chambers, a housing enclosing the said nozzle and blading systems, an air inlet valve for charging air under pressure into each of said explosion chambers, an outlet valve for each of said chambers for the discharge of the residual combustion gases, said air inlet and combustion gas outlet valves being adapted to be open simultaneously to cause the entering air to displace the residual combustion gases which are discharged through said outlet valve, and means connected with the outlet valve for conducting the residual gases to a space behind the last nozzle and blading system.

2. Apparatus according to claim 1, wherein the explosion chambers are provided with a plurality of additional outlet valves for combustion gas portions having different pressures at the instant of their discharge from the explosion chambers.

3. Apparatus according to claim 1, wherein the explosion chambers are provided with a plurality of additional outlet valves for combustion gas portions having different pressures at the instant of their discharge from the explosion chambers, and a catch nozzle assembly disposed in the housing portion of the blading arrangement receiving the combustion gas portion which is at the lowest pressure at the moment of its discharge from the explosion chamber, through one of said additional outlet valves, said catch nozzle assembly being in open communication with the conduits for the residual combustion gas portion discharged from the explosion chambers.

4. Apparatus for generating driving combustion gases, comprising a plurality of explosion chambers, nozzle and blading systems arranged to receive high pressure explosion gases from said chambers, a housing enclosing the said nozzle and blading systems, an air inlet valve for charging air under pressure into each of said explosion chambers, an outlet valve for each of said chambers for the discharge of the residual combustion gases, said air inlet and combustion gas outlet valves being adapted to be open simultaneously to cause the entering air to displace the residual combustion gases which are discharged through said outlet valve, a driving gas withdrawal conduit for leading off the partially deenergized gases, from the housing, a catch nozzle assembly disposed in the housing portion and blading arrangement receiving the combustion gas portion which is at the lowest pressure at the moment of its discharge from the explosion chamber, a connecting body between the catch nozzle assembly and the driving gas withdrawal conduit, and conduits leading from the outlet valves for the residual combustion gases and discharging behind the last nozzle and blading arrangement, viewed in the direction of the gas flow.

5. Apparatus according to claim 4, wherein the said connecting body and the conduits for the residual combustion gases are separated from each other up to the point of their discharge into the driving gas withdrawal conduit.

6. Apparatus according to claim 4, wherein the connecting body is disposed within the housing.

7. Apparatus according to claim 1, including a driving gas withdrawal conduit for leading off the partially deenergized gases, and connecting tubes arranged between the outlet valves of the explosion chambers and said withdrawal conduit.

8. Apparatus according to claim 1, including a driving gas withdrawal conduit for leading off the partially deenergized gases, and connecting tubes arranged between the outlet valves of the explosion chambers and said withdrawal conduit, said connecting tubes being disposed inside the housing.

9. Apparatus according to claim 4, including connecting tubes between the outlet valves of the explosion chambers and the driving gas withdrawal conduit, said tubes being separated from said connecting body.

10. Apparatus according to claim 1, including a driving gas withdrawal conduit for leading off the partially deenergized gases, and connecting tubes arranged between the outlet valves of the explosion chambers and said withdrawal conduit, said connecting body and tubes debouching into the driving gas withdrawal conduit at its inlet plane.

11. Apparatus according to claim 1, including a driving gas withdrawal conduit for leading off the partially deenergized gases, and connecting tubes arranged between the outlet valves of the explosion chambers and said withdrawal conduit, said connecting body and tubes being in the form of thin-walled, bladder-like hollow members.

12. Apparatus according to claim 1, including a catch nozzle arrangement behind the last blading system, a driving gas withdrawal conduit for leading off the partially deenergized gases, and connecting tubes arranged between the outlet valves of the explosion chambers and said withdrawal conduit, said connecting body and tubes being nested one within the other and constituting the headpiece and transition member between the driving gas withdrawal conduit and the catch nozzle arrangement and the outlet valves for the residual combustion gases.

13. Apparatus for generating driving combustion gases, comprising a plurality of explosion chambers, nozzle and blading systems arranged to receive high pressure explosion gases from said chambers, an air inlet valve for charging air under pressure into each of said explosion chambers, an outlet valve for each of said chambers for the discharge of residual combustion gases out of said chambers, each of said chambers having also a nozzle valve for each of the nozzle and blading systems, control means for said valves adapted to keep the outlet valve of a chamber open during the charging thereof with air to cause simultaneous discharge of the residual combustion gases by way of the outlet valve, said control means displacing the working cycles of the chambers in such manner that while the nozzle valve of one chamber is discharging higher pressure explosion gases to the last nozzle and blading system, the outlet valve of another chamber simultaneously discharges its residual combustion gases, a driving gas withdrawal conduit for leading off the gas delivered by the generator under pressure, said outlet valves being connected to the withdrawal conduit to discharge the residual gases thereinto, the valves being so timed that the pressure of the residual combustion gases at the moment of opening of an outlet valve is so much higher than the pressure in the withdrawal conduit that the pressure behind the said last nozzle and blading system initially rises and then falls as the residual gases expand along a line which is approximately parallel to the expansion line in the Q-V diagram of the live explosion gases in said last nozzle and blading system, said last nozzle and blading system discharging pressure gases which have been partially deenergized therein, into the said withdrawal conduit.

14. Apparatus for generating driving combustion gases, comprising a plurality of explosion chambers, nozzle and blading systems arranged to receive high pressure explosion gases from said chambers, an air inlet valve for charging air under pressure into each of said explosion chambers, an outlet valve for each of said chambers for the discharge of residual combustion gases out of said chambers, each of said chambers having also a nozzle valve for each of the nozzle and blading systems, control means for said valves adapted to keep the outlet valve of a chamber open during the charging thereof with air to cause simultaneous discharge of the residual combustion gases by way of the outlet valve, said control means displacing the working cycles of the chambers in such manner that while the nozzle valve of one chamber is discharging higher pressure explosion gases to the last nozzle and blading system, the outlet valve of another chamber simultaneously discharges its residual combustion gases, a driving gas withdrawal conduit for leading off the gas delivered by the generator under pressure, said outlet valves being connected to the withdrawal conduit to discharge the residual gases thereinto, the valves being so timed that the pressure of the residual combustion gases at the moment of opening of an outlet valve being so much higher than the pressure in the withdrawal conduit that the pressure behind the said last nozzle and blading system initially rises and then falls as the residual gases expand along a line which is approximately parallel to the expansion line in the Q-V diagram of the live explosion gases in said last nozzle and blading system, and a catch nozzle assembly behind the said last nozzle and blading system for receiving the explosion gases discharging therefrom, said catch nozzle assembly discharging into the driving gas withdrawal conduit.

15. Apparatus according to claim 14, including a housing for the generator, and means providing a space of small volume and connecting the catch nozzle assembly with the withdrawal conduit.

16. Apparatus according to claim 14, including a housing for the generator, and means providing a space of small volume and connecting the catch nozzle assembly with the withdrawal conduit, said means being disposed within the turbine housing but separated from the space thereof.

17. Apparatus according to claim 14, wherein the generator includes a housing and wherein the catch nozzle assembly discharges partially deenergized pressure gases into said housing.

References Cited in the file of this patent

UNITED STATES PATENTS

| 1,933,385 | Noack | Oct. 31, 1933 |
| 1,969,753 | Holzwarth | Aug. 14, 1934 |
| 2,010,823 | Noack | Aug. 13, 1935 |